United States Patent [19]

Kawakami et al.

[11] 4,275,186

[45] Jun. 23, 1981

[54] OLIGOMER EXTENDED POLYARYLETHERS

[75] Inventors: James H. Kawakami, Piscataway; George T. Kwiatkowski, Green Brook, both of N.J.

[73] Assignee: Union Carbide Corporation, New York, N.Y.

[21] Appl. No.: 928,459

[22] Filed: Jul. 27, 1978

[51] Int. Cl.³ .................. C08G 63/66; C08G 63/68
[52] U.S. Cl. ................................. 528/174; 528/175
[58] Field of Search ......................... 528/174, 175

[56] References Cited

U.S. PATENT DOCUMENTS

| | | | |
|---|---|---|---|
| 3,419,526 | 12/1968 | Schnell et al. | 528/174 |
| 3,912,688 | 10/1975 | Schiller et al. | 528/174 |
| 4,116,940 | 9/1978 | Korshak et al. | 528/174 |

FOREIGN PATENT DOCUMENTS 1208825  10/1970  United Kingdom .................... 528/175

*Primary Examiner*—Hosea E. Taylor
*Assistant Examiner*—Amelia B. Yarbrough
*Attorney, Agent, or Firm*—Donald M. Papuga

[57] ABSTRACT

Oligomers of hydroxy terminated polysulfones are extended to high molecular weight polysulfones by carbonate, ester, ether or silyl ether linkages.

14 Claims, No Drawings

OLIGOMER EXTENDED POLYARYLETHERS

BACKGROUND OF THE INVENTION

This invention pertains to oligomeric polysulfones and, more particularly, to normally solid polyarylene polyether polysulfone thermoplastic resins obtained by extension of oligomeric polysulfone with carbonates, esters, ethers or silyl ether linkages.

Polyarylene polyether polysulfone thermoplastic resins constitute a family of tough, rigid, high-strength thermoplastics which maintain their properties over a temperature range from −150° F. (−101° C.) to above 300° F. (149° C.). These polysulfone resins can be prepared by a substantially equimolar one-step reaction of a double alkali metal salt of a dihydric phenol with a dihalobenzenenoid compound in the presence of specific liquid organic sulfoxide or sulfone solvents under substantially anhydrous conditions using an azeotroping solvent, such as, chlorobenzene. They may also be prepared by Friedel-Crafts reactions in which sulphone linkages are formed by reaction of aryl sulphonyl chlorides with aromatic nuclei as well as by a monosalt process as disclosed by ICI in British Pat. No. 1,016,245.

The preferred polysulfones are prepared by the first method and a particularly preferred resin is one composed of repeating units having the structure shown below:

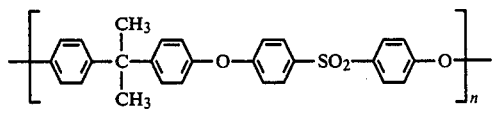

wherein n=about 10 to about 500. This is commercially available from Union Carbide Corporation as UDEL Polysulfone P-1700. For the synthesis of this resin the dihydric phenol is bisphenol A, i.e., 2,2-bis(p-hydroxyphenyl) propane. Other dihydric phenols which can be used include the following: 2,2-bis-(4-hydroxyphenyl)-propane, 2,4-dihydroxydiphenylmethane, bis-(2-hydroxyphenyl)methane, bis-(4-hydroxyphenyl)methane, bis-(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)ethane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, bis(4-hydroxyphenyl)cyclohexylmethane, 1,2-bis-(4-hydroxyphenyl)-1,2-bis-(phenyl)-propane, 2,2-bis-(4-hydroxyphenyl)-1-phenyl-propane and the like;

Di(hydroxyphenyl)sulfones such as bis-(4-hydroxyphenyl)sulfone, 2,4′-dihydroxydiphenyl sulfone, 5′-chloro-2,4′-dihydroxydiphenyl sulfone, 5′-chloro-4,4′-dihydroxydiphenyl sulfone and the like;

Di(hydroxyphenyl) ethers such as bis-(4-hydroxyphenyl)-ether, the 4,5′-, 4,2′-, 2,2′-, 2,3′-dihydroxydiphenyl ethers, 4,4′-dihydroxy-2,6-dimethyldiphenyl ether, bis-(4-hydroxy-3-isobutylphenyl)-ether, bis-(4-hydroxy-3-isopropylphenyl)-ether, bis-(4-hydroxy-3-chlorophenyl)ether, bis-(4-hydroxy-3-fluorophenyl)-ether, bis-(4-hydroxy-3-bromophenyl)-ether, bis-(4-hydroxynaphthyl)-ether, bis-(4-hydroxy-3-chloronaphthyl)-ether, bis-(2-hydroxydiphenyl)-ether, 4,4′-dihydroxy-2,6-dimethoxydiphenyl)ether, 4,4′-dihydroxy-2,5-diethoxydiphenyl)ether, 4,4′-dihydroxydiphenyl and the like and mixtures thereof.

Also suitable are the bisphenol reaction products of 4-vinyl-cyclohexene and phenols, e.g., 1,3-bis(p-hydroxyphenyl)-1-ethylcyclohexane and the bisphenol reaction products of dipentene or its isomers and phenols such as 1,2-bis(p-hydroxyphenyl)-1-methyl-4-isopropylcyclohexane as well as bisphenols such as 1,3,3-trimethyl-1-(4-hydroxyphenyl)-6-hydroxyindane, and 2,4-bis-(4-hydroxyphenyl)-4-methylpentane, and the like.

Particularly desirable dihydric polynuclear phenols have the formula

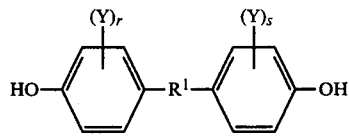

wherein Y is an alkyl having 1 to 4 carbon atoms r and s have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 9 carbon atoms.

While polysulfone resins have found wide commercial use in molding and extrusion applications for the electronic, electrical, appliance, auto, aircraft and general industrial markets as well as adhesives because of their adhesion to hot metals, inherent high softening point and outstanding heat stability, their use has been hampered due to high cost of production. Part of this high cost has been attributed to the need for handling high polymer viscosity resins in filtration, extraction and solvent devolatilization operations which severely limit capacities and increases production cycles.

It is therefore an object of this invention to provide a more economical route to the production of polysulfone resins.

It is also an object of this invention to avoid formation of by-products which are difficult to remove or are deterious to the final polymer product.

Other objects will become apparent to those upon a further reading of the specification.

SUMMARY OF THE INVENTION

It has now been found that high molecular weight polyarylene polyether polysulfone resins having a reduced viscosity of at least 0.2 dl./g. in chloroform at 25° C. can be prepared from oligomeric polysulfone resins having low viscosities and number average molecular weights of up to about 5000 which are hydroxy terminated by extending the molecular weight of these oligomers by coupling them in a post copolymerization reaction with a comonomer selected from the group consisting of diaryl carbonates, diaryl esters, diglycidyl ethers and diorgano difunctional silyl coupling agents having the formula:

$$(D')_2Si(E)_2$$

wherein D′ is a monovalent hydrocarbon radical selected from the group consisting of alkyl having 1 to about 4 carbons, cycloalkyl having 5 to about 7 carbons and aryl having 6 to 10 carbons and E is a monovalent radical selected from the class consisting of OH, alkoxy having 1 to about 6 carbons, aryloxy having 6 to about 10 carbons, acyloxy having 2 to about 4 carbons, amino and ureido groups.

The reactions involved with each of these comonomers is delineated below where I is a polysulfone having the formula shown below.

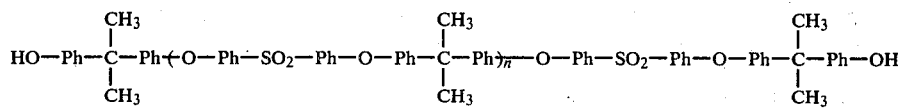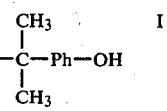

wherein Ph=phenylene and n is an integer having values of about 5 to 10.

peratures of about 180° to about 400° C. in bulk or in solution at lower temperatures.

The lower viscosity of the oligomeric polysulfone permits higher polymer concentrations in both the reactor, filtration, and polymer recovery steps which increases the plant capacity substantially.

While the introduction of the bridging moieties enumerated above theoretically could have some effects on the gross properties of the final high molecular weight polysulfone obtained only minor effects were noted for the most part. There is a slight lowering of the second

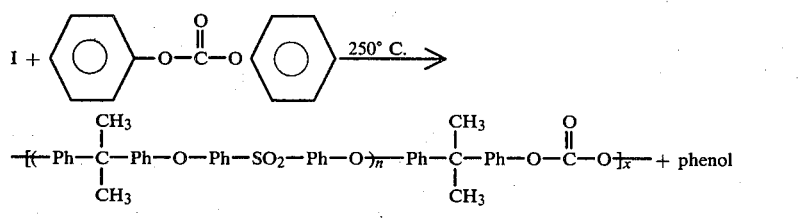

(A)

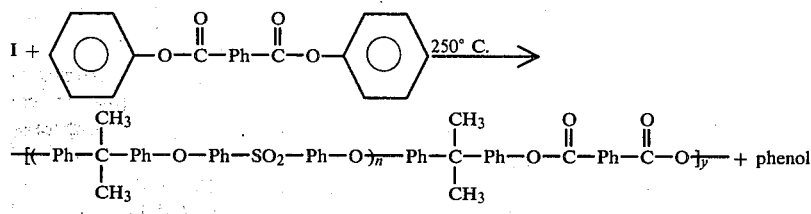

(B)

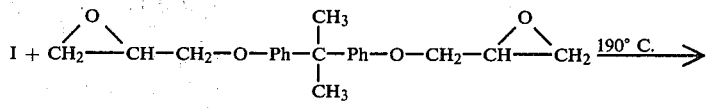

(C)

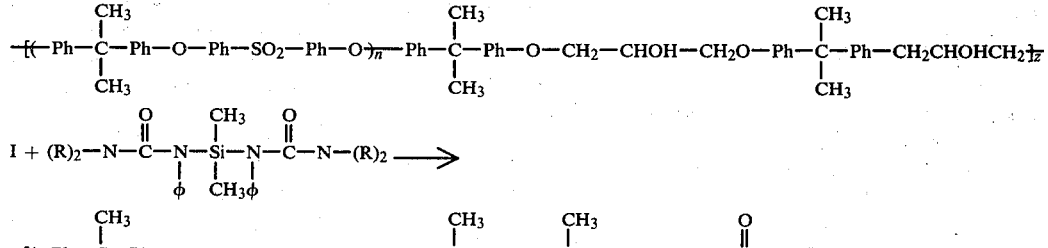

(D)

wherein x, y, z and t are integers having values of about 5 to 25 and R is alkyl having 1 to 4 carbons.

The term high molecular weight polysulfone is used herein to mean polysulfone copolymers having number average molecular weights of about 10,000 or greater.

The resultant polysulfone resins obtained by the method of this invention are modified in structure by including as linking or bridging groups, carbonate, ester, ether, or silyl moieties respectively. However, these modified polysulfone resins retain the basic character and properties of the unmodified polysulfone resins heretofore available.

The extension polymerization reaction can be effected in conventional extrusion equipment by merely blending approximately stoichiometric quantities of oligomeric polysulfone resin and comonomer at temorder transition temperature (Tg) with carbonate and ester moieties of about 5° to about 7° as compared with the unmodified molecular weight polysulfone resin. This is not considered significant. In one instance, however, relatively poor hydrolytic stability of the resultant polysulfone resin was encountered when the bridging moiety was a siloxane moiety, as demonstrated by a decrease in tensile strength after seven days in boiling 5% sodium hydroxide. However, this would only exclude this polymer for recommended use in hot water applications.

Thermogravimetric analysis in air showed that carbonate and terephthalate linked hydroxy terminated sulfone oligomers are slightly less stable than UDEL P-1700. These modified polysulfones start to lose weight at about 400° C. in contrast with UDEL Polysulfone P-1700 which begins to lose weight at 420° C. This, however, is a small effect.

Transesterification catalysts useful in promoting the coupling of polysulfones with diaryl carbonates or esters include alkali metal hydroxides, i.e., hydroxides of sodium, potassium, or lithium, tetraalkyl-titanates having 1 to 4 carbons in the alkyl groups and the like.

The invention is further described in the Examples which follow. All parts and percentages are by weight unless otherwise specified.

EXAMPLE 1

Preparation of Hydroxy Terminated Polysulfone Oligomer

To a one-liter 4-necked round bottom flask was added 114.14 g. (0.5 mol) of bisphenol A, 146 ml of chlorobenzene and 208 ml of dimethyl sulfoxide. The solution was sparged with nitrogen for 30 minutes and heated to 45° C. Then 79.8 grams of 50.1% aqueous sodium hydroxide was added drop-wise over a period of 15 minutes. About 10 ml of hot water was syringed along the walls of the addition funnel to complete the transfer of caustic.

The mixture was brought to reflux (116° C.) and a chlorobenzene-water azeotrope was separated returning the chlorobenzene to the flask. In 2.5 hours the dehydration was complete. A heat gun was used to remove residual water. The temperature was increased from 141° C. to 153° C. by distilling off the chlorobenzene. Then 132.2 g. (0.46 mol) of dichlorodiphenyl sulfone dissolved in 135 ml of hot chlorobenzene (>100° C.) was added at such a rate as to control the exotherm. After heating at 160°–165° C. for 1.5 hours, the mixture was cooled to 88° C. and 11 g. (0.087 mol) of oxalic acid dihydrate was added, assuming there was no excess caustic consumed during the oligomerication process. It was expected that 0.92 mols of caustic reacted leaving 0.08 mols of sodium hydroxide in excess. Therefore, approximately 0.007 mols of 11% excess oxalic acid was used. Subsequent studies showed that the equilibrium shift from sodium phenoxide end groups to the phenol end groups is not complete unless a large excess of acid is present.

The yield of hydroxy terminated polysulfone oligomer was 200 grams. When titrated with tributyl ammonium hydroxide in methylene chloride, the sample contained 0.62±0.01 percent by weight of hydroxyl end groups. The number average molecular weight (Mn) equals $(2) \times (17) \div 0.0062 = 5484$.

EXAMPLE 2

Preparation of Carbonate Linked Polysulfone Resin

A 100 ml 2-necked flask fitted with a stirrer, reflux condenser, thermometer and addition funnel was added 16.440 g. (0.003 mol) of hydroxyl terminated polysulfone oligomer prepared in Example 1. The flask was immersed in a bath which was raised to a temperature of 225° C. in order to melt the oligomer. Then 0.6427 g. (0.003 mols) of diphenyl carbonate was added. After 40 minutes at 225° C., 8 g. of phenol was added. The reaction mixture was mixed with a spatula. In five minutes a trace of lithium hydroxide was added and mixed in thoroughly with a spatula. After 25 minutes of mixing vacuum was carefully applied. Excess foaming occurred initially. In 35 minutes the temperature was increased to 250° C. and the vacuum was reduced to 4 millimeters. It appeared that all of the phenol had distilled over at that time. After 40 minutes at 250°–258° C. (2 mm) the reaction mixture was cooled. The polymer, carbonate-linked polysulfone resin, was recovered by breaking the flask. The polymer was dissolved in methylene chloride, filtered and coagulated in excess methanol. The reduced viscosity of the polymer thus obtained in chloroform at 25° C. was 0.30 dl/g.

EXAMPLE 3

Preparation of Carbonate Linked Polysulfone Resin

The procedure described in Example 2 was repeated with the exception that the lithium hydroxide was mixed with the phenol before adding to the melted oligomer. High vacuum was not applied as quickly to reduce the loss of diphenyl carbonate. The mixing before the application of vacuum was carried out again with a spatula. The resin obtained was dissolved in methylene chloride, filtered and coagulated in methanol. The reduced viscosity in chloroform of this resin was 0.43 dl/g.

The hydrolytic stability of this resin was determined by measuring several mechanical properties at 25° C. after one week in boiling 5 percent sodium hydroxide. As a control UDEL Polysulfone P-1700 was used. In Table 1 below, the comparative figures for modulus, yield strength, yield elongation, tensile strength at break and elongation at break (ASTM D-638) are shown.

TABLE I

HYDROLYTIC STABILITY TEST

| | Example 3 polysulfone | | P-1700 polysulfone | |
|---|---|---|---|---|
| | Initial | NaOH immersion for 1 week | Initial | NaOH immersion for 1 week |
| Yield Strength, psi | None | None | 10,800 | 10,200 |
| Yield Elongation, % | None | None | 4 | 6 |
| Tensile Strength At Break, psi | 10,700 | 10,200 | 8,500 | 7,400 |
| Elongation At Break, % | 3.5 | 4 | 50 | 50 |
| Modulus, psi | 235,000 | 340,000 | 250,000 | 360,000 |

EXAMPLE 4

Terephthalate Linked Polysulfone

To a 100 ml, 2-necked flask was added 8.2 g. (0.0015 mols) of polysulfone oligomer prepared in Example 1 which was then heated to the melt stage. Then 0.954 g. (0.003 mols) of diphenyl terephthalate was added and mixed with a spatula under nitrogen. After mixing, 8.22 g. of additional polysulfone oligomer was charged and mixed. Molten phenol containing 0.1 g. of lithium hydroxide was added and the reactants were mixed at 200°–220° C. for 15 minutes. As vacuum was applied phenol started to distill over. Distillation was continued for about one hour and ten minutes gradually increasing the temperature from 220° to 260° C. and lowering the vacuum from 250 mm to 1 mm. Resultant modified polysulfone resin had a reduced viscosity in chloroform at 25° C. of 0.52 dl/g.

The hydrolytic resistance of this polymer was also determined by measuring several mechanical properties initially and after boiling for 1 week in 5% aqueous NaOH. These data are shown in Table II below.

TABLE II

| Test | HYDROLYTIC RESISTANCE | |
|---|---|---|
| | Initial | After Boiling |
| Modulus, psi | 283,000 | 360,000 |
| Tensile strength, psi | 9,800 | 9,800 |
| Elongation at Break, % | 5 | 3 |
| Pendulum impact, ft. lbs/in.$^3$ | 69 | 33 |
| Tg, °C. | 171 | — |
| Flow, °C. | ca. 230 | — |
| Melt failure, °C. | ca. 290 | — |

EXAMPLE 5

Preparation of Diglycidyl Ether of Bisphenol a Linked Polysulfone

To a 500 ml, 4-necked flask was added 30.10 g. (0.01 moles) of polysulfone hydroxyl oligomer (prepared as in Example 1), 50 ml of monochlorobenzene and 40 ml. of dichlorobenzene was distilled off to remove any traces of water present. The reaction mixture was cooled from 180° C. to 160° C. and 1.72 g. (0.01 moles) of diglycidyl ether of bisphenol A together with 0.03 g. ($7.9 \times 10^{-5}$ moles) of the disodium salt hexahydrate of bisphenol A was added to the reaction flask. After 1.5 hours at 180° C. the mixture was diluted with chlorobenzene and neutralized with 0.1 g. of oxalic acid. Coagulation from methanol yielded a polysulfone copolymer of the diglycidyl ether of bisphenol A having a reduced viscosity of 0.53 dl/g. in chloroform at 25° C. The Tg of this copolymer was 165° C., the tensile strength 11,200 psi and the pendulum impact strength was 56 ft. lb./in.$^3$. Boiling 5 percent sodium hydroxide exposure for one week did not significantly change these mechanical properties. As shown in Table III where comparison is made with this product with UDEL Polysulfone P-1700.

TABLE III

| | HYDROLYTIC STABILITY | |
|---|---|---|
| TEST | EXAMPLE 5 POLYSULFONE AFTER BOILING IN 5% AQUEOUS NaOH | P-1700 POLYSULFONE AFTER BOILING IN 5% AQUEOUS NaOH |
| Modulus, psi | 366,000 | 350,000 |
| Tensile strength, psi | 11,200 | 10,600 |
| Elongation at break, % | 4 | 4 |
| Weight change, % | −0.19 | — |
| Pendulum impact strength, ft. lbs./in.$^3$ | 39 | 56 |

EXAMPLE 6

Extruder Carbonate Coupling of Polysulfone Oligomer

A charge of 1582.8 g. of polysulfone oligomer (prepared as in Example 1), 64.2 g. of diphenyl carbonate and 0.4 g. of lithium hydroxide monohydrate was dry blended overnight on a bottle roller. The resultant blend was then processed through a vented, screw-drive extruder at vacuum settings such that foaming was controlled. The entrance temperature was 260° C. and the exit temperature was 300° C. The reduced viscosity of the extrudate was 0.24 dl/g. in chloroform at 25° C.

EXAMPLE 7

Preparation of Dimethyl Silane Coupled Polysulfone

To a 300 ml 3-necked flask was added 36.6 g. (0.00608 moles) of oven dried polysulfone oligomer (prepared as in Example 1) and 100 ml of chlorobenzene. Approximately 50 ml of chlorobenzene was distilled off to assume removal of moisture. The flask was cooled (0° to 3° C.) and 2.72 g. (0.00608 moles) of silyl bisurea

$$(CH_3)_2Si[N(C_6H_5)CON)C_4H_8]_2$$

dissolved in 20 ml of chlorobenzene was added dropwise. Two 5 ml rinses with chlorobenzene were used to complete the transfer of silyl bisurea to the reaction flask. The molecular weight of the oligomer increased rapidly until a spatula full of phenol and 100 ml of chlorobenzene was added. The resultant polysulfone coupled with dimethyl silane, coagulated in methanol, showed a reduced viscosity of 1.05 dl/g. in chloroform at 25° C. A 10 mil plaque molded from the polymer fluff had a reduced viscosity of 0.75 dl/g. indicating some hydrolysis during molding. After boiling for 1 week in 5% aqueous NaOH, the reduced viscosity of the polymer was 0.5 dl/g.

A comparison of mechanical properties of the dimethyl silane coupled polysulfone before and after boiling in 5% aqueous NaOH for 1 week is presented in Table IV. The stability of this polymer in air as measured by thermogravimetric analysis is the same as P-1700 polysulfone.

TABLE IV

| | HYDROLYTIC STABILITY | |
|---|---|---|
| TEST | INITIAL | AFTER BOILING |
| Modulus, psi | 347,000 | 366,000 |
| Tensile strength, psi | 10,500 | 6,000 |
| Elongation at Break, % | 4 | 2 |
| Weight change, % | — | — |
| Pendulum Impact | 55 | 25 |

Although the invention has been described in its preferred forms, with a certain amount of particularity, it is understood that the present disclosure of the preferred forms has been made only by way of example and that numerous changes may be resorted to without departing from the spirit and scope of the invention.

What is claimed is:

1. Method of preparing a high molecular weight, polyarylene polyether polysulfone having a reduced viscosity of at least 0.2 dl/g in chloroform at 25° C. which comprises coupling essentially stoichiometric quantity of an hydroxy terminated oligomeric polyarylene polyether polysulfone having a number average molecular weight of up to about 5000 in a post copolymerization reaction with essentially stoichiometric quantity of a comonomer selected from the group consisting of diaryl carbonates, diaryl esters of carboxylic acids or diorgano difunctional silyl coupling agents having the formula:

$$(D)_2Si(E)_2$$

wherein D is a monovalent hydrocarbon radical selected from the group consisting of alkyl having 1 to about 4 carbons, cycloalkyl having 5 to about 7 carbons and aryl having 6 to about 10 carbons and E is a monovalent radical selected from the class consisting of OH, alkoxy having 1 to about 6 carbons, aryloxy having 6 to about 10 carbons, acyloxy having 2 to about 4 carbons, amino and ureido groups at a temperature of about 180° to about 400° C.

2. Method claimed in claim 1 wherein the carbonate is diphenyl carbonate.

3. Method claimed in claim 1 wherein the ester is diphenyl isophthalate.

4. Method claimed in claim 1 wherein the ester is diphenyl terephthalate.

5. Method claimed in claim 1 wherein the silyl coupling agent has the formula:

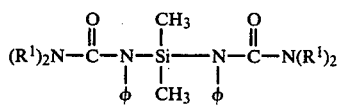

wherein $R^1$ is alkyl having 1 to 4 carbons.

6. Method claimed in claim 1 wherein the coupling reaction is effected by extruding a homogeneous blend of polyarylene polyether polysulfone, diaryl carbonate and transesterification catalyst through a screw drive, vented extruder at a temperature of about 180° C. to about 400° C.

7. Method claimed in claim 6 wherein the coupling agent is diphenyl carbonate.

8. Method claimed in claim 6 wherein the coupling agent is diphenyl isophthalate, diphenyl terephthalate or a mixture thereof.

9. Method of preparing a high molecular weight, polyarylene polyether polysulfone having a reduced viscosity of at least 0.2 dl./g. in chloroform at 25° C. which comprises coupling essentially stoichiometric quantity of an hydroxy terminated oligomeric polyarylene polyether polysulfone having a number average molecular weight of up to about 5000 in a post copolymerization reaction with essentially stoichiometric quantity of a diaryl carbonate at a temperature of from about 180° to about 400° C.

10. Polysulfone made by the method claimed in claim 9.

11. Method of preparing a high molecular weight, polyarylene polyether polysulfone having a reduced viscosity of at least 0.2 dl./g. in chloroform at 25° C. which comprises coupling essentially stoichiometric quantity of an hydroxy terminated oligomeric polyarylene polyether polysulfone having a number average molecular weight of up to about 5000 in a post copolymerization reaction with essentially stoichiometric quantity of a comonomer selected from the group consisting of diaryl carbonates or diorgano difunctional silyl coupling agents having the formula:

wherein D is a monovalent hydrocarbon radical selected from the group consisting of alkyl having 1 to about 4 carbons, cycloalkyl having 5 to about 7 carbons and aryl having 6 to about 10 carbons and E is a monovalent radical selected from the class consisting of OH, alkoxy having 1 to about 6 carbons, aryloxy having 6 to about 10 carbons, acyloxy having 2 to about 4 carbons, amino and ureido groups at a temperature of about 180° to about 400° C.

12. Polysulfone made by the method claimed in claim 11.

13. Method of preparing a high molecular weight, polyarylene polyether polysulfone having a reduced viscosity of at least 0.2 dl/g in chloroform at 25° C. which comprises coupling essentially stoichiometric quantity of an hydroxy terminated oligomeric polyarylene polyether polysulfone having a number average molecular weight of up to about 5000 in a post copolymerization reaction with essentially stoichiometric quantity of the diglycidyl ether of 2,2'-bis(p-hydroxyphenyl)propane.

14. Polysulfone made by the method claimed in claim 13.

* * * * *